United States Patent [19]

Ebner

[11] 4,227,999

[45] Oct. 14, 1980

[54] ULTRAFILTRATION PROCESS AND APPARATUS

[75] Inventor: Heinrich Ebner, Bonn-Ippendorf, Fed. Rep. of Germany

[73] Assignee: Heinrich Frings GmbH & Co. KG, Bonn, Fed. Rep. of Germany

[21] Appl. No.: 9,261

[22] Filed: Feb. 5, 1979

[30] Foreign Application Priority Data

Feb. 24, 1978 [DE] Fed. Rep. of Germany ....... 2808022

[51] Int. Cl.³ ..................... B01D 13/00; B01D 31/00
[52] U.S. Cl. ................................. 210/650; 210/195.2; 210/196; 210/253; 210/257.2; 210/321 R; 210/335; 210/779
[58] Field of Search ................... 210/321 R, 76, 335, 210/416 M, 22, 23 R, 23 H, 321 B, 321 A, 433 M, 104, 125, 128, 189, 195 S, 257 M, 262, 295, 323 T, 23 F, 73 R, 340, 341, 196, 197, 253

[56] References Cited

U.S. PATENT DOCUMENTS

| | | | |
|---|---|---|---|
| 3,796,314 | 3/1974 | Kolek | 210/321 R |
| 3,926,813 | 12/1975 | de Putter | 210/433 M |
| 3,974,068 | 8/1976 | Ebner et al. | 210/23 F |
| 4,073,730 | 2/1978 | Shorr et al. | 210/321 R |

FOREIGN PATENT DOCUMENTS 2546579 9/1977 Fed. Rep. of Germany ......... 210/23 F

OTHER PUBLICATIONS

"Membrane Ultrafiltration" M. C. Porter et al., Chem. Tech. Jan., 1971, p.p. 56-63.
"New Separation Technique for the CPI" A. S. Michael et al., Chem. Eng. Prog. vol. 64, No. 12, pp. 31-43.

Primary Examiner—Robert H. Spitzer
Assistant Examiner—David R. Sadowski
Attorney, Agent, or Firm—Norbert P. Holler

[57] ABSTRACT

In the ultrafiltration of liquids such as vinegar, wine, etc., the liquid to be filtered is fed from and back to a circulating tank through at least one filtration circuit including at least two serially connected, vertically spaced, non-horizontal filter modules through each of which the liquid flows from top to bottom. Each filter module consists of a pipe enclosing a bundle of capillary tubes of semi-permeable membrane material and having a lateral outlet for filtered liquid. Each two successive filter modules are separated from one another by a fall interval zone through which unfiltered liquid can flow with a negligibly low pressure drop from the outlet of the upper filter module to the inlet of the lower one, and each fall interval zone is so arranged that the pressure drop occurring in the upper one of each two successive filter modules is equalized, to the extent of about 0.5 to 1.5 times, by the weight of the liquid column in that fall interval zone, thereby to establish and maintain at the inlet of the lower one of each two successive filter modules approximately the same hydrostatic pressure as is established and maintained at the inlet of the upper one. This abstract is not to be taken either as a complete exposition or as a limitation of the present invention, however, the full nature and extent of the invention being discernible only by reference to and from the entire disclosure.

11 Claims, 1 Drawing Figure

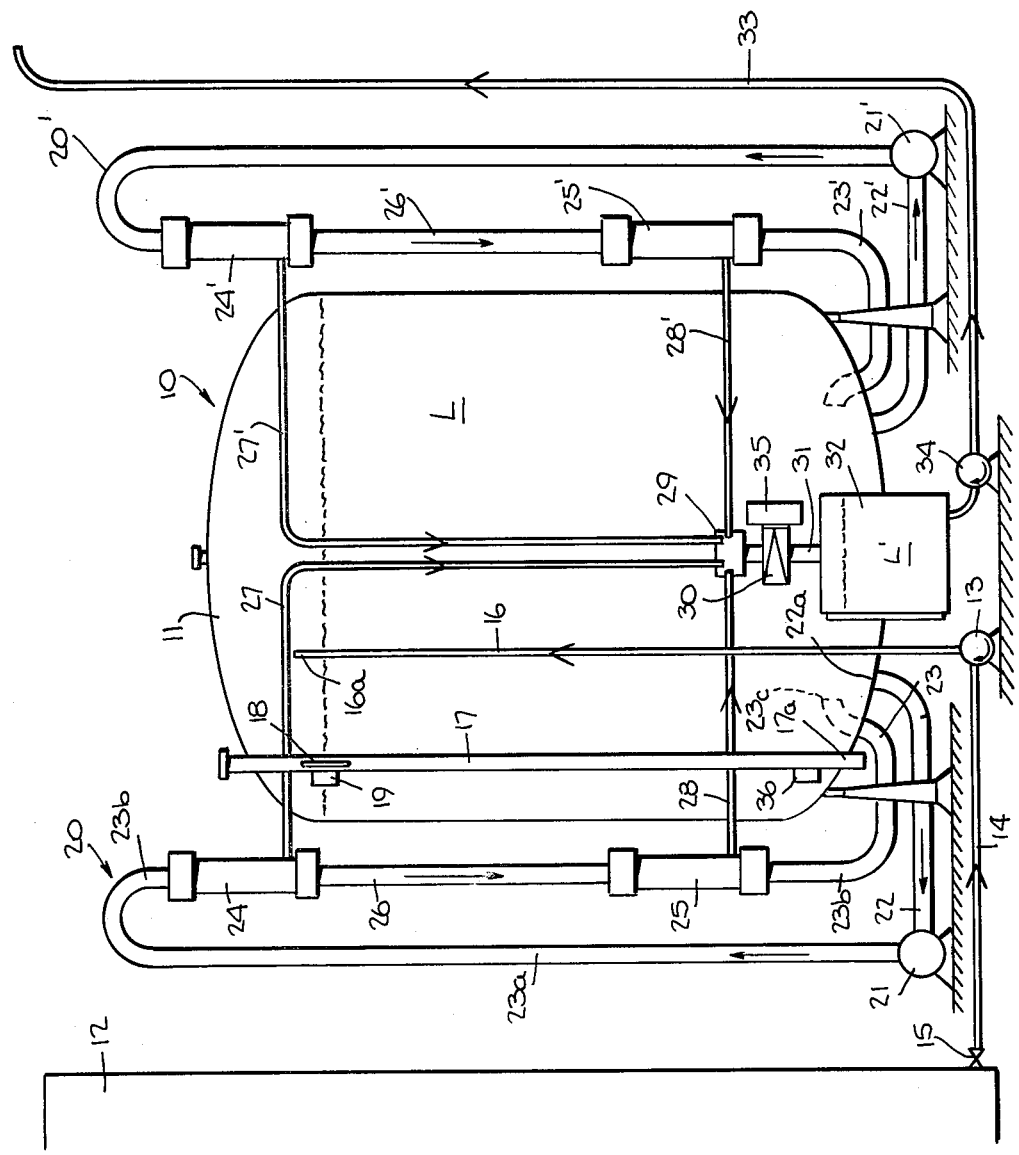

ULTRAFILTRATION PROCESS AND APPARATUS

This invention relates to a process and apparatus for the continuous ultrafiltration of liquids containing either microorganisms or insoluble fine solids in not too great quantities, for example vinegar, fruit juices, wine, and the like.

In U.S. Pat. No. 3,974,068 and Austrian Pat. No. 308,767, the disclosures of which in their entirety are incorporated herein by this reference, there is described a process of ultrafiltration in which the liquid to be filtered is moved parallel to a plane membranous filter surface incorporated in a filter-equipped filtration circuit connected at both its intake and discharge ends to a circulating tank, and the hydrostatic pressure normal to the filter surface does not exceed 300 mbar. The membrane filter in this process is at least 300 mm long, and the height of the liquid column above the filter surface is at least 1 mm. In conjunction therewith, the flow velocity of the moving liquid is so selected that the hydrodynamic pressure is greater than the product of the hydrostatic pressure times the ratio of the maximum to minimum cross-section of added filtering aid particles times the coefficient of friction of the filtering aid particles relative to the filter surface. The filtering aid particles preferably are cellulose particles which are approximately 100 times larger than the particles to be filtered out, and they are used in a quantity ranging from 0.01 to 1.0 weight percent of the liquid to be filtered moving through the filtration circuit. The duration of a filtration run normally is 5 days. In the general form of the apparatus disclosed in the aforesaid patents for practicing this process, the filter means in the filtration circuit is defined by at least one filter channel which is at least 1 mm high and at least the lower boundary of which is constituted by a filter membrane. The actual system described has a filter membrane at both the upper and the lower boundaries of the filter channel, and the latter includes a medial rectangular frame covered by two filter plates which have porous bases and support the respective filter membranes. The largest filter described in the examples set forth in the patents has a filtration surface of 750 cm$^2$.

When attempts were made to scale this process up to a commercial scale, however, in which filtration surfaces having areas between 5 and 50 m$^2$ are required, unexpected difficulties were encountered. On the other hand, it proved to be economically unfeasible to make membrane-bounded filter channels of the required dimensions. On the other hand, known plate filters utilizing plane filter membranes did not satisfy the laminar flow requirements of the process.

The first step toward a breakthrough to overcome these drawbacks came when a new class of filter modules containing bundles of parallel capillary tubes of 1.5 to 5 mm diameter and made of polymeric semipermeable membrane material, e.g. polyamide, became commercially available. A filter module of this type basically comprises a bundle of parallel, open-ended, membranous capillary tubes confined in an outer sleeve. The opposite end regions of the tubes are embedded in respective transverse bodies of epoxy resin which is applied thereto so as to leave the end openings of the capillary tubes open end-wise of the sleeve. The resin also serves to secure the bundle of tubes in a fluid-tight manner to the respective opposite end regions of the interior surface of the sleeve. The capillary tubes are otherwise unconnected and unsupported in the sleeve. The sleeve is closed at its opposite ends by a pair of end caps equipped with pipe fittings so that unfiltered liquid can enter the module at one end region of the sleeve and can leave the module at the other end region of the sleeve after having flowed through the capillary tubes. The sleeve is further provided with a lateral drain fitting intermediate the locations of the epoxy seals so that filtered liquid which has passed through the walls of the capillary tubes can be extracted from the module. A filter module of this type having a filtering surface area of 4.5 m$^2$ may, for example, include a bundle of 1,910 capillary tubes of 1.5 mm diameter and 500 mm length arranged in a 150 mm diameter sleeve. Further details of these filter modules are set forth in two related printed publications: G. Wysocki (Fried. Krupp GmbH), *Chemie-Technik* 5, 177 (1976) [article entitled "Eine Neue Ultrafiltrationsanlage-Technologie and Wirtschaftlichkeit"], and a brochure entitled "Ultrafiltrations-Anlagen" published by Fried. Krupp. GmbH. To the extent necessary for an understanding of the construction and manner of functioning of these filter modules, therefore, the contents of both of these publications are incorporated in this application by this reference.

Through the use of such filter modules it was thus possible to obtain filters with the requisite filtration surface area. However, when it was attempted to incorporate such a filter module in a filtration circuit and to use the same in the process described in U.S. Pat. No. 3,974,068, a further difficulty was encountered. The required flow velocity of the unfiltered liquid passing through the capillary tubes and the attendant possible hydrostatic pressure could, of course, be very readily calculated, but it became evident that the pressure drop resulting from liquid flow through horizontally arranged capillary tubes under these conditions would then be in the neighborhood of 200 mbar. Because the hydrostatic pressure consequently required would be too high, it became impossible to connect a second filter module in series with the first one, which is desirable for purposes of an economic filtration process, since for each filtration circuit the circulating pump must be brought up to its rated output independently of how many filter modules the circuit contains.

To state the problem somewhat differently, the aforesaid U.S. Pat. No. 3,974,068 teaches that by the addition to the liquid being filtered of a very small quantity of cellulose or comparable filtering aid particles it is possible to maintain the hydrostatic filtration pressure so low that the filtration surface can be maintained free of settling filtered out solids by means of the hydrodynamic pressure of the moving filtering aid particles. However, the pressure drop in a horizontal filter module utilizing capillary tubes of, for example, 1.5 mm diameter and 500 mm length is, at the requisite flow velocity and as a function of the small diameter of the capillary tubes, about 200 mbar. This was not the case where the filter utilized a membrane surface having a flat expanse. On the other hand, the total hydrostatic pressure should, if at all possible, be only about 300 mbar. These conflicting considerations cannot be readily reconciled.

As a possible way of avoiding this difficulty, there have become known ultrafiltration processes which are run at pressures of about 0.5 to 5 bar and in which such capillary tube type filter modules are vertically arranged and connected in parallel, so that they can be exposed to the full hydrostatic pressure of the circulating pump. In these processes, the unfiltered liquid flows through the filter modules from the bottom to the top of each. A substantial drawback of these processes is that they cannot be performed continuously but rather must be interrupted by frequent, almost daily, cleaning operations.

The basic object of the present invention thus is to provide a novel and improved ultrafiltration process and correspondingly an ultrafiltration system of the aforesaid type which enable the drawbacks of the aforesaid known ultra-filtration processes and systems to be efficaciously avoided and which can be operated on a commercial scale continuously, without damage to the environment, with a high filtration output and efficiency, and with the least possible servicing or "down time" requirements.

Generally speaking, the objectives of the present invention are achieved by an ultrafiltration process and apparatus which are characterized by the provision of a filtration circuit having incorporated therein at least two serially connected, non-horizontally and preferably vertically arranged filter modules through each of which the liquid to be filtered flows in a correspondingly non-horizontal flow path from top to bottom, with each filter module being located above the next succeeding filter module, and with each two successive filter modules being separated from one another by a fall interval zone (also defining a non-horizontal flow path) in which a negligibly low pressure drop occurs (i.e. the flow through the fall zone is effected substantially without pressure loss) and which has a liquid column height corresponding to from 0.5 to 1.5 times the pressure drop of the upper one of the two successive filter modules.

More particularly, in accordance with the present invention, insofar as its method aspects are concerned, there is provided a process for the continuous ultrafiltration of liquids, wherein the liquid to be filtered is circulated from and back to a circulating tank through at least one filtration circuit, with the liquid level in the circulating tank being maintained substantially constant by replenishment of the liquid to be filtered as required, which process is characterized in that (a) in each filtration circuit (i) there is provided a plurality of serially arranged non-horizontal filter modules each having a top inlet and a bottom outlet and each having its outlet located at a higher elevation than the inlet of the respective next lower filter module, (ii) the liquid to be filtered flows in sequence through all of the associated filter modules from the top to the bottom of each of the same, and (iii) filtered liquid is extracted from each filter module intermediate the inlet and outlet of the same, (b) a hydrostatic pressure of between 200 and 700 mbar is established and maintained at the inlet of the uppermost first filter module in each filtration circuit, (c) the liquid exiting from the outlet of the upper one of each two successive filter modules of each filtration circuit is permitted to flow to the respective next lower filter module with a negligibly low pressure drop through a respective fall interval zone arranged between each two successive filter modules, the height of each such fall interval zone being such (i) that the pressure drop occurring in the upper one of each two successive filter modules is equalized, to the extent of from 0.5 to 1.5 times, by the weight of the liquid column in the associated fall interval zone immediately therebelow and (ii) that as a consequence about the same hydrostatic pressure is established and maintained at the inlet of the lower one of each two successive filter modules as at the inlet of the upper one, and (d) the hydrostatic pressure at the outlet of the lowermost last filter module in each filtration circuit is established and maintained at between 100 and 400 mbar as a function of the weight of the liquid column in said circulating tank above the level of said outlet of said last filter module.

Correspondingly, in accordance with the present invention, insofar as its apparatus aspects are concerned, there is provided, for the continuous ultrafiltration of liquids, an apparatus which includes a circulating tank for the liquid to be filtered, means for effecting an automatic feed of liquid into said tank, means for controlling said feed means so as to maintain a substantially constant level of liquid in said tank, and means for circulating the liquid to be filtered from and back to said tank and including at least one filtration circuit having an intake end and a discharge end both connected to said tank, the apparatus being characterized in that it has (a) a plurality of serially arranged non-horizontal filter modules incorporated in each filtration circuit between said intake and discharge ends thereof, each of said filter modules having a top inlet and a bottom outlet and each having its outlet located at a higher elevation than the inlet of the respective next lower filter module, so that in each filtration circuit the liquid to be filtered flows in sequence through all of the associated filter modules from the top to the bottom of each of the same, and each of said filter modules intermediate said inlet and outlet thereof having a connection for enabling filtered liquid to be extracted from that filter module, and (b) non-horizontal means establishing between the outlet of each of said filter modules and the inlet of the respective next lower filter module of each filtration circuit a fall interval zone constructed and arranged to permit liquid to flow with a negligibly low pressure drop from the outlet of the upper one of each two successive filter modules to the inlet of the immediately following lower filter module, the height of each such fall interval zone being such that the pressure drop occurring in the upper one of each two successive filter modules is equalized, to the extent of from 0.5 to 1.5 times, by the weight of the liquid column in the associated fall interval zone immediately therebelow and that as a consequence about the same hydrostatic pressure is established and maintained at the inlet of the lower one of each two successive filter modules as at the inlet of the upper one.

By the way of background for and to facilitate an understanding of the present invention, the following considerations should be noted, it being assumed that all the filter modules in any given filtration circuit are substantially identical in terms of their structure.

The pressure drop $\Delta p$ in a capillary tube can be expressed as $$\Delta p = \frac{32 \eta \cdot v \cdot l}{d^2}$$

in which
 $\eta$ = viscosity of the liquid,
 $v$ = flow velocity of the liquid,
 $l$ = length of the capillary tube, and
 $d$ = diameter of the capillary tube.

It follows, therefore, that in a given filtering run the pressure drop in a capillary tube type filter module is essentially a function of the liquid flow velocity therein, since the capillary tube diameter and the substrate being filtered out are constants. It follows then further, since the hydrostatic pressure established at the inlet of the first filter module in a series should also be established to approximately the same magnitude at the inlet of the next successive filter module in order to achieve corresponding filter efficiencies, that the pressure drop occurring in the first filter module must be compensated for, i.e. recouped or equalized.

To this end, in the process and system according to the present invention the outlet of the first and upper one of each two successive filter modules is located at a higher elevation than the inlet of the second and lower one, and between them there is provided a fall interval zone through which unfiltered liquid can flow with a negligibly low pressure drop. In the currently contemplated best mode of the present invention, this fall interval zone is constituted by a non-horizontal, preferably vertical, duct or pipe of sufficiently large diameter that at the velocity of flow of the liquid therethrough the frictional resistance to movement of the liquid in the pipe can for all practical purposes be ignored. As a result, since in such a pipe there is developed an increase in pressure at the bottom of the column of liquid, which is expressed as $$\Delta p = \rho \cdot g \cdot H$$

in which
$\rho$ = density of the liquid,
g = acceleration due to gravity, and
H = height of the liquid column in the pipe,
the desired compensation for and recoupment of the pressure drop that occurred in the upper filter module can be achieved by a suitable choice of the dimension H. The applicability of this principle and the known fact, that in the case of water a column height of 1 m corresponds to a pressure of about 100 mbar (actually 98.1 mbar), to the present invention will become clear as the description proceeds. It will be apparent, of course, that if a vertical pipe is used to define the fall interval zone, H then is simply the length of that pipe.

With the foregoing discussions as a backdrop, it will be understood from the following how, through this invention, it becomes possible to compensate for and thus to recoup the pressure drop undergone by the liquid to be filtered in each filter module connected into the filtration circuit. Assuming, as a starting point, the use of two 500 mm long filter modules, the first departure from the process and system described in the aforesaid patents is that the filter modules are arranged preferably vertically and each with its inlet at the top, so that the liquid being filtered flows through each module from the top to the bottom thereof. Assuming further that the static pressure at the inlet of the first module is set at, for example, 400 mbar, and that under the given operating conditions there would ordinarily be a 200 mbar pressure drop occuring in that module, it will be seen that the vertical orientation of the module results in the creation in the module of a 500 mm high water column above its outlet, which in turn results in an increase of 50 mbar hydrostatic pressure at the outlet of the filter module and thus compensates for that much of the module pressure drop. This means that the net pressure drop is only 150 mbar, so that the pressure at the first filter module outlet is 250 mbar. The reason for the vertical orientation of the filter module will thus be clear, and likewise the fact that any non-horizontal orientation would have a similar effect although to a lesser degree depending on the deviation from the vertical.

If, now, as contemplated by the present invention, the second filter module were incorporated into the filtration circuit with its inlet immediately following the outlet of the first filter module, the static pressure at the second module inlet would be essentially the same 250 mbar and thus the second filter module would not yield the same degree of filtration as the first one. Accordingly, pursuant to the present invention, the second filter module is positioned with its inlet below the outlet of the first one and between the outlet of the latter and the inlet of the second module there is provided a preferably vertical fall interval zone through which the liquid can flow with a negligibly low pressure drop (again, other non-horizontal orientations can be used to achieve similar effects although not to the same degree). The fall interval zone, in the posited system, would be 1.5 m long, and its presence results in the creation of a 1500 mm high water column above the inlet of the second filter module, corresponding to a hydrostatic pressure of 150 mbar, thereby bringing the total pressure at that point back up to 400 mbar, i.e. substantially the same pressure as was established and maintained at the inlet to the first module. Concomitantly, provision must be made to ensure that the static pressure at the outlet of the second filter module is maintained at the desired level of 250 mbar. This latter pressure is determined by the level of the liquid in the circulating tank, so that in the posited system that level must lie 2.5 m above the outlet of the lower filter module.

From the foregoing it will further be understood that the present invention makes it possible to use three or more non-horizontal filter modules serially connected into the filtration circuit, by having each filter module arranged with its outlet located above the level of the inlet of the next succeeding filter module and with the outlet of the upper one of each two successive filter modules connected to the inlet of the next lower filter module by a non-horizontal fall interval zone which compensates for the pressure loss in the immediately preceding module as precisely as possible, in such a manner that all of the modules provide the same filtration output and are operatable at an optimum fashion, all subject, of course, to the condition that the overall system must have the necessary total height. Within the contemplation of the present invention, therefore, the level of the liquid in the circulating tank may be controlled so as to remain, during the principal filtration period, from 1 to 4 m above the level of the outlet of the lowermost filter module. In this connection it should be noted that it would in and of itself also be possible to fix and maintain the hydrostatic pressure at the outlet of the lowermost filter module by means of a throttling device incorporated in the return duct of the filtration circuit at that point, but a control of the pressure through the liquid level in the circulating tank has been found to be better.

As a general matter it is preferred that both the intake and the discharge end of the filtration circuit, by which the extraction of the liquid being filtered from and its return to the tank are effected, open into the circulating tank near the bottom of the same, with the return duct or discharge end in particular opening tangentially and horizontally into the tank. In this manner it is possible to ensure that the filtering aid particles remain uniformly in suspension in the liquid and that the unfiltered liquid flowing through the filter modules is always well mixed. This arrangement of the filtration circuit becomes of even greater significance when a filtration run has proceeded continuously for an extended period, say for about 30 days, because at that time the concentration of the solids contents of the circulating tank will necessarily have increased substantially while the amount of liquid in the tank will have decreased.

As yet another facet of the present invention, the volume of the circulating tank is advantageously so chosen that it corresponds to from 0.5 to 2 times the daily filtration output. This means that in a 30-day filtration run a 15- to 60-fold increase in the concentration of the sediment or solids in the tank is attained; this increase in the solids concentration can then be multiplied still further by a factor of 10 through a reduction of the total volume of material in the circulating tank before the filtration run has to be interrupted for purposes of cleaning.

The foregoing and other objects, characteristics and advantages of the present invention will be more clearly understood from the following detailed description thereof when read in conjunction with the accompanying drawing, in which the sole FIGURE is a schematic illustration, in elevation, of a filter system embodying the principles of the present invention.

Referring now to the drawing, a filter system 10 is there shown which includes a circulating tank 11 into which liquid L to be filtered can be fed from a storage tank or reservoir 12 via a feed line including a feed pump 13, an intake duct section 14 connected between the pump and an outlet valve or fitting 15 of the reservoir 12, and a discharge duct section 16 connected between the pump and the circulating tank, with the duct section 16 opening at 16a into the upper region of the circulating tank. A level sensing or gage tube 17 communicates at its lower end 17a with the interior of the tank 11 and contains a magnetic float 18. Suitably arranged (if desired, adjustably) exteriorly of the level sensing tube 17 adjacent the upper end region thereof is a magnetically actuated switch 19 which is connected into the energization circuit (not shown) for the feed pump 13, the switch arrangement being such that when the float 18 is at the level of the switch 19, the latter is operated to open the power circuit for the pump 13. In this manner, the level of the liquid in the circulating tank can be kept substantially constant.

The filter system 10 according to the present invention further includes a filtration circuit 20 associated with the circulating tank 11 in a manner to be described presently. In the drawing, two such filtration circuits (the second one is designated 20') are shown, but it will be understood that the system may include only one or, on the other hand, more than two filtration circuits, depending on the size of the installation. Ordinarily, of course, in a commercial installation all such additional filtration circuits would be identical with the circuit 20, but this is clearly not essential. In any event, only the circuit 20 will be described in detail herein, with corresponding salient parts of the circuit 20' being, however, identified by primed corresponding reference numerals.

Referring now to the filtration circuit 20, the same is intended to extract unfiltered liquid from the circulating tank and to return it thereto and includes a circulating pump 21, an intake duct section 22 connected between the circulating tank and the pump 21, and a discharge duct section 23 connected between the pump and the circulating tank. The duct section 23 has a rising portion 23a extending from its juncture with the pump 21 to a level above the top of the tank 11, and a preferably vertically descending portion 23b. Incorporated in the latter and connected in series with each other are two vertically oriented filter modules 24 and 25 of the capillary tube type described hereinbefore, the arrangement being such that the bottom outlet of the upper filter module 24 is located at approximately the level of the liquid in the circulating tank and at a higher elevation than the top inlet of the lower filter module 25 and is connected to the latter by a length of pipe 26 ordinarily between about 0.5 and 2.5 m long. The pipe 26, which can be made of stainless steel, polyvinyl chloride or any other suitable material and ordinarily is connected to the end caps of the associated filter modules, defines a fall interval zone between the two modules, and to this end its internal diameter is chosen to be such that unfiltered liquid exiting from the upper filter module can flow through the pipe with at most a negligibly low pressure drop. The intake duct section 22 of the filtration circuit opens at 22a directly into the bottom of the circulating tank for direct entry of the liquid into the duct. The discharge duct section 23, on the other hand, though it extends into the circulating tank through the bottom thereof, has an end portion 23c which is located above the tank bottom and is oriented substantially tangentially of the tank (actually, of course, parallel to a tangent to the tank) as well as horizontally, for the reasons set forth hereinabove. Although it is not expressly shown in the drawing, in the currently contemplated best mode of the system according to the present invention the intake end 22a and the discharge or return end 23c of the filtration circuit 20 are located at an appreciable distance from one another in different quadrants of the tank and preferably also with the discharge end 23c facing generally away from the intake end 22a.

Reverting now to the filter modules 24 and 25, as previously mentioned the outer sleeves of the two modules are provided intermediate their respective ends, preferably near their outlet end regions, with respective drain fittings (not shown) to which are connected respective filtrate ducts 27 and 28 for extracting filtered liquid that has passed through the membrane walls of the capillary tubes. The ducts 27 and 28 lead into a small first intermediate container 29, constructed of glass to make the liquid stream visible, connected with a filtrate monitoring device 30 which in turn communicates via a duct 31 with a larger second intermediate or accumulator container 32. Transfer of filtered liquid L' from the container 32 to a storage tank (not shown) is effected by means of a feed line 33 having a feed pump 34 connected therein, with the container 32 preferably being equipped with a suitable level sensing device (not shown) electrically connected to the pump 34 so as to cause the latter to be activated intermittently whenever a sufficient quantity of the liquid L' has accumulated in the container 32. The filtrate monitoring device 30 includes a suitable light sensor and turbidity meter 35, for continuously monitoring a fraction of the filtered liquid for cloudiness, the meter being electrically connected to the energization circuitry for the system to interrupt the filtration process whenever the turbidity of the filtered liquid rises above a predetermined limit.

It will be understood, of course, that a commercial filter system embodying the principles of the present invention will also have incorporated therein numerous other features conventionally used in comparable systems. Thus, the circulating tank 11 will be equipped with temperature and pressure gages, vents and vent filters, a manhole, a fluid inlet at the top and a drain at the bottom for cleaning and flushing purposes, and fail-safe devices responsive to such conditions as excessive temperatures, pressures and liquid levels (including surges) to deactivate the system in a case of emergency or if one of the already described cut-off devices fails to work properly. Corresponding features will be provided on or in connection with the filtrate container 32. Also, the filtration circuit (or circuits) may additionally be equipped, say in the rising portion 23a of the duct section 23, with a coarse particle filter to prevent clogging of the filter modules by such particles. Since these and comparable features do not constitute any part of the present invention, however, they have not been illustrated in the drawing for the sake of clarity.

The following will serve to exemplify the operation of the filter system 20 and the performance of an ultrafiltration process according to the present invention in a vinegar filtration run. The physical parameters of the system are as follows:

The circulating tank 11 has a volume of about 8,000 liters. The system also includes two filtration circuits 20 in each of which there is included a feed pump 21 with a capacity of 20,000–30,000 liters per hour, two vertically oriented and serially connected filter modules 24 and 25 each 500 mm long and including within the outer sleeve thereof a bundle of polyamide capillary tubes 1.5 mm in diameter and sufficient in number to provide an aggregate filter surface area of 4.5 m$^2$, and a 1.5 m long pipe interconnecting and defining between the outlet of the upper filter module and the inlet of the lower one a fall interval zone to enable the unfiltered vinegar to flow therethrough with negligibly low pressure drop. The switch 19 is set to control the pump 13 so as to maintain the liquid level in the tank 11 at a height of 2.5 m above the outlet of the lower filter module in each filtration circuit.

Before the filtration run is begun, there are added into the circulating tank 11 approximately 3.2 kg of cellulose particles having a particle size of about 50–200 microns to serve as a filtering aid material. With the pump 13 operating or shut down as required, the pumps 21 and 21' are started and feed unfiltered liquid from the circulating tank to the top inlets of the two upper filter modules 24 and 24'. A hydrostatic pressure of approximately 400 mbar is thereby established at the inlet of each of the upper filter modules under the action of the pumps 21 and 21'. The unfiltered liquid flows through the filter modules at a velocity producing a net pressure drop of 150 mbar. The hydrostatic pressure at the outlet of each upper filter module thus is about 250 mbar. The filtrate extracted from the upper filter modules is collected via the ducts 27 and 27' in the container 29 from which a fraction is continuously monitored in the device 30 by the turbidity meter 35 while the rest passes directly to the filtrate container 32 from which it is automatically, albeit intermittently, fed with the aid of the pump 34 to the final storage container (not shown).

Unfiltered liquid exiting from the upper filter modules flow through the 1.5 m long fall interval zones 26 and 26' and thence into the lower filter modules 25 and 25'. Since the hydrostatic pressure at the outlets of the lower filter modules is maintained at 250 mbar by the column height of the unfiltered liquid in the circulating tank 11 and the liquid columns accumulated above the inlets of the lower filter modules provide respective static pressures of 150 mbar, these latter pressures are added to the substantially unreduced 250 mbar pressures at the outlets of the upper filter modules, which establishes at the lower filter module inlets respective static pressures of approximately 400 mbar. Thus, approximately the same pressure is established and maintained at the inlets of the lower filter modules as is established and maintained at the inlets of the upper filter modules. Unfiltered liquid exiting from the lower filter modules then is returned into the tank via the portions 23b of the duct sections 23 and 23'. Filtered liquid extracted from the lower filter modules passes to the container 32 through the ducts 28 and 28' in the same manner as described above for the filtrate from the upper filter modules.

The capacity of the filter system 10 operating continuously is from about 12,000 to 15,000 liters of vinegar in 24 hours. After about 30 days, the concentration of bacteria (Acetobacter) in the circulating tank 11 has increased about 60-fold. The pump 13 is then turned off, so that as the filtration then continues the level of the liquid in the circulating tank sinks and the bacteria concentration increases still further. When the liquid level in the tank 11 reaches the level of a lower magnetic switch 36 mounted adjacent the level sensing tube 17, the float 18 activates the switch to turn off the circulating pumps 21 and 21'.

It has been found to be advantageous at that point to fill the circulating tank 11 with water and then again to start the pumps 21 and 21' to subject the material in the tank to a renewed filtration operation as described above, until once again the bacteria concentration in the tank has increased as far as possible. In this way, the loss of vinegar can be reduced to less than 0.2 percent, a value which has never been achieved by heretofore available filter systems. At the completion of the second filtration run, the contents of the circulating tank 11, consisting of a concentrate of vinegar bacteria and cellulose particles, is disposed of. The waste is minimal, however, when it is compared, on the one hand with the waste of bentonite and bacteria sediment which has heretofore been a concomitant of the required fining of the vinegar, and on the other hand with the waste occurring over and above that by virtue of the disposal of the filter cake (consisting of asbestos and diatomaceous earth) used in the actual filtration.

The filter system according to the present invention thus provides a substantial advantage insofar as protection of the environment is concerned, and over and above that also leads to very great savings in labor and time. Moreover, as soon as the filter system has been cleaned with water and a cleaning solution, it is again ready for the next month-long automatic filtration run.

Although the filter system according to the present invention was especially designed for the practice of the process disclosed in the aforesaid U.S. Pat. No. 3,974,068, it is not to be considered as limited to the use of a hydrostatic pressure of at most 300 mbar at the inlets of the various filter modules. Rather, the system can also be used with higher hydrostatic pressures as long as the relationships between the hydrostatic and hydrodynamic pressures set forth in the said patent are maintained. The practical limit for the system and the process, dictated essentially by the pump output and pressure drop, is currently believed to lie at about 700 mbar.

It should also be noted that the capillary tube type filter modules disclosed herein, utilizing (in a fashion corresponding to Wysocki and the Krupp brochure) polyamide membrane material and each having a filter surface area of between about 0.5 and about 9.0 m$^2$ defined by a large bundle of about 250 to 500 mm long capillary tubes of about 1 to 5 mm diameter, are currently preferred as the filter means to be incorporated in the filtration circuits, because such filter modules provide the system with the large filter surface area required for an economically acceptable commercial scale filtration process. Those skilled in the art will readily recognize, however, that filter modules of other dimensions and constructions which likewise meet the requisite laminar flow conditions and, while of an acceptable physical size, also provide an adequate filter surface area, can be used as well in the practice and implementation of the basic aspects of the present invention.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. In a process for the continuous ultrafiltration of liquids, wherein (a) the liquid to be filtered is circulated from and back to a circulating tank through at least one filtration circuit, (b) each filtration circuit is provided with a respective plurality of serially connected filter modules each having an inlet and an outlet for the liquid being filtered, (c) each of said filter modules gives rise, under the conditions of the process, to a substantial drop of the hydrostatic pressure prevailing at its inlet, (d) filtered liquid is extracted from each filter module intermediate the inlet and outlet of the same, and (e) the liquid level in the circulating tank is maintained substantially constant by replenishment of the liquid to be filtered as required;

the improvement comprising that:
(A) in each filtration circuit (i) each of the serially connected filter modules defines a non-horizontal path of flow for the liquid to be filtered, each of said filter modules has its inlet at the top and its outlet at the bottom, and each outlet is located above the level of the inlet of the respective next lower filter module, and (ii) the liquid to be filtered flows in sequence through all of the associated filter modules downwardly from the top to the bottom of each of the same,
(B) a hydrostatic pressure of between 200 and 700 mbar is established and maintained at the inlet of the uppermost first filter module in each filtration circuit,
(C) the liquid exiting from the outlet of the upper one of each two successive filter modules of each filtration circuit is permitted to flow downwardly in a non-horizontal path to the inlet of the respective next lower filter module substantially without pressure loss through a respective fall interval zone arranged between each two successive filter modules, the height of each such fall interval zone being such (i) that the pressure drop occurring in the upper one of each two successive filter modules is equalized, to the extent of from 0.5 to 1.5 times, by the weight of the liquid column in the associated fall interval zone immediately therebelow and (ii) that as a consequence about the same hydrostatic pressure is established and maintained at the inlet of the lower one of each two successive filter modules as at the inlet of the upper one, and
(D) the hydrostatic pressure at the outlet of the lowermost last filter module in each filtration circuit is established and maintained at between 100 and 400 mbar as a function of the weight of the liquid column in said circulating tank above the level of said outlet of said last filter module.

2. The process of claim 1, wherein unfiltered liquid being circulated through each filtration circuit both enters the same from and is discharged back into said circulating tank in the bottom region of the latter, and such discharge is effected substantially tangentially of the circulating tank.

3. The process of claims 1 or 2, wherein after an initial filtration run has achieved a predetermined increase in the concentration of the unfiltered liquid in said circulating tank, the feed of further unfiltered liquid into said tank is interrupted while the filtration is continued, to achieve a still greater increase in such concentration, until the level of the liquid in said circulating tank drops to a predetermined minimum, water is then added to the remaining contents of said tank, and the same are then subjected to a second filtration run until the level of the liquid in said tank again sinks to said predetermined minimum.

4. The process of claims 1 or 2, wherein after an initial filtration run has achieved a predetermined increase in the concentration of the unfiltered liquid in said circulating tank, the feed of further unfiltered liquid into said tank is interrupted while the filtration is continued, to achieve a still greater increase in such concentration, until the level of the liquid in said circulating tank drops to a predetermined minimum.

5. In an apparatus for the continuous ultrafiltration of liquids, which apparatus includes (a) a circulating tank for the liquid to be filtered, (b) means for effecting an automatic feed of liquid into said tank, (c) means for controlling said feed means so as to maintain a substantially constant level of liquid in said tank, (d) means for circulating the liquid to be filtered from and back to said tank and including at least one filtration circuit having an intake end and a discharge end both connected to said tank, (e) a plurality of serially connected filter modules incorporated in each filtration circuit between said intake and discharge ends thereof, (f) each of said filter modules having an inlet and an outlet for the liquid being filtered, and (g) each of said filter modules further having intermediate its inlet and outlet a connection for enabling filtered liquid to be extracted from that filter module;

the improvement which comprises:
(A) each of the serially connected filter modules incorporated in each filtration circuit defines a non-horizontal path of flow for the liquid to be filtered, each of said filter modules has its inlet at the top and its outlet at the bottom, and each outlet is located above the level of the inlet of the respective next lower filter module, so that in each filtration circuit the liquid to be filtered flows in sequence through all of the associated filter modules downwardly from the top to the bottom of each of the same, and (B) means defining a non-horizontal path of flow and establishing between the outlet of each of said filter modules and the inlet of the respective next lower filter module of each filtration circuit a fall interval zone constructed and arranged to permit liquid to flow substantially without pressure loss downwardly from the outlet of the upper one of each two successive filter modules to the inlet of the immediately following lower filter module, the height of each such fall interval zone being such that the pressure drop occurring in the upper one of each two successive filter modules is equalized, to the extent of from 0.5 to 1.5 times, by the weight of the liquid column in the associated fall interval zone immediately therebelow and that as a consequence about the same hydrostatic pressure is established and maintained at the inlet of the lower one of each two successive filter modules as at the inlet of the upper one.

6. The apparatus claimed in claim 5, wherein each of said filter modules comprises an outer sleeve, and a multiplicity of parallel capillary tubes confined substantially lengthwise in said sleeve, each of said capillary tubes being composed of permeable membrane material and having a diameter from about 1 to 5 mm.

7. The apparatus claimed in claims 5 or 6, wherein each of said filter modules is oriented to define a vertical path of liquid flow therethrough.

8. The apparatus claimed in claims 5 or 6, wherein each of said filter modules and each of said means establishing a fall interval zone between two successive filter modules is oriented to define a vertical path of liquid flow therethrough.

9. The apparatus claimed in claim 5, wherein each of said means establishing a fall interval zone between two successive filter modules is a length of pipe of sufficient diameter to minimize any possible frictional resistance of the internal surface of said pipe to flow of the unfiltered liquid flowwing therethrough.

10. The apparatus claimed in claims 6 or 9, wherein each of said filter modules and each said length of pipe between two successive filter modules is oriented to define a vertical path of liquid flow therethrough.

11. The apparatus claimed in claims 5 or 6, wherein both said intake end and said discharge end of each filtration circuit are defined by ducts connected to the bottom of said circulating tank, and the duct defining said discharge end of said filtration circuit is arranged to open substantially tangentially into said circulating tank.

* * * * *